(12) United States Patent
Rowady, Jr.

(10) Patent No.: US 7,565,417 B2
(45) Date of Patent: Jul. 21, 2009

(54) EVENT-DRIVEN FINANCIAL ANALYSIS INTERFACE AND SYSTEM

(76) Inventor: E. Paul Rowady, Jr., 343 W. Eric St., Suite 300, Chicago, IL (US) 60610

( * ) Notice: Subject to any disclaimer, the term of this patent is extended or adjusted under 35 U.S.C. 154(b) by 1006 days.

(21) Appl. No.: 11/122,926

(22) Filed: May 5, 2005

(65) Prior Publication Data
US 2005/0261999 A1 Nov. 24, 2005

Related U.S. Application Data

(60) Provisional application No. 60/573,002, filed on May 20, 2004.

(51) Int. Cl.
*G06F 17/60* (2006.01)
(52) U.S. Cl. ............... 709/220; 709/225; 709/203; 709/201; 709/217; 705/35
(58) Field of Classification Search ............. 709/220, 709/225
See application file for complete search history.

(56) References Cited

U.S. PATENT DOCUMENTS

| | | | |
|---|---|---|---|
| 5,946,666 A | 8/1999 | Nevo et al. | |
| 6,012,042 A | 1/2000 | Black et al. | |
| 6,278,982 B1 | 8/2001 | Korhammer et al. | |
| 6,628,312 B1 | 9/2003 | Rao et al. | |
| 6,681,211 B1 | 1/2004 | Gatto | |
| 2002/0052820 A1* | 5/2002 | Gatto | 705/36 |
| 2002/0156714 A1 | 10/2002 | Gatto | |
| 2003/0065601 A1 | 4/2003 | Gatto | |
| 2006/0265320 A1 | 11/2006 | Duquette | |
| 2007/0067211 A1 | 3/2007 | Kaplan et al. | |

OTHER PUBLICATIONS

International Search Report for PCT/US05/16840 dated May 13, 2005.

* cited by examiner

*Primary Examiner*—Jude J. Jean Gilles
(74) *Attorney, Agent, or Firm*—Brinks Hofer Gilson & Lione

(57) ABSTRACT

A system for graphically displaying financial markets event data to a user includes a computer, one or more databases remote from the computer, a communications link configured to permit the computer to access the databases and a user interface having a display device coupled to the computer configured to display information about a selected security, securities or related scenario on a single display screen. The information displayed further includes a time series representing past historical data for the security over a selectable period of time, a first group of catalysts mapped in parallel with the time series of the past historical data corresponding to the security and a second group of catalysts mapped to future data corresponding to the security. Each catalyst is represented by an icon. The icon has one or more attributes that provide direct visual information to the user if the data density is less than a predetermined value, but only indicates an existence of the catalyst and a time frame of the catalyst if the data density is greater than the predetermined value.

19 Claims, 12 Drawing Sheets

EVENT-DRIVEN FINANCIAL ANALYSIS INTERFACE AND SYSTEM

CROSS-REFERENCE TO RELATED APPLICATIONS

This application claims the benefit of priority from provisional patent application Ser. No. 60/573,002, filed on May 20, 2004, entitled Alphacution Platform. Application Ser. No. 60/573,002 is hereby incorporated by reference in its entirety.

FIELD OF THE INVENTION

The present invention relates generally to a system and method for displaying data, and more specifically to an interface for presenting complex financial and market data in an organized and logical format, which permits the user to quickly and efficiently understand and absorb the data presented.

BACKGROUND

Financial market participants, whether they are research analysts, portfolio managers, traders, brokers or private investors, are dependent upon data and information to make informed investment decisions and manage risk. Information is the critical raw material of the global financial markets. The providers of this information are members of the market data industry, which as of the end of 2003, represented $6.7 billion in revenue. Such information typically includes event related data, which may be any information that is likely to effect the valuation of one or more securities.

The most comprehensive financial market systems for the monitoring and management of financial market related data and information are provided by Bloomberg LP, Reuters Ltd., and Thomson Financial (a division of the Thomson Corporation). FactSet Research Systems, Inc. may be considered a fourth major player in this market. Together, these companies represent over 90% of the global revenues in the market data industry. Such information providers have earned a significant share of the market data industry because they each control the sources of the data and content, as well as the technical platforms to capture, store and distribute such data and content. There are many other smaller companies that provide subsets of the data, information and content.

To make this data useful to users, some of the information providers have designed specific user interfaces, sometimes referred to as visual metaphors, to "amplify" and/or improve cognition. Some of these interfaces specifically address the presentation of event-related data. One basic example of a visual metaphor for events is a calendar. This makes some sense because events are highly time-sensitive. Another example of an event presentation method is a standard security price chart with the capability to overlay a single category of events, which are marked by a symbol (usually an arrow or a letter). This method is similar to a timeline.

However, due to the massive number of unique events in financial market systems, the calendar template is unable to display more than a few different types of events without becoming cluttered, thereby rendering it nearly useless to the user. The timeline method fails for the same reason. In short, none of the existing "visual metaphors" or user interfaces adequately capture and organize the breadth of relevant event data in a way that it can be easily understood and absorbed by the user. Therefore, despite the sophistication of some known market data platforms, users may still resort to manually creating "catalyst calendars" and events lists using tools, such as Microsoft Excel, a whiteboard, or pencil and paper.

SUMMARY

Due to the extremely high density of event-related information flowing through the interface of the present invention, including information such as linkages to underlying content, data sources, and data publishers, the present invention provides a solution for gathering information and improving user awareness, as well as enhancing user decision making capability, as will be described below.

By representing financial market events as symbols or icons on a display, and organizing these symbols in multiple dimensions simultaneously (including in parallel with security prices or other time-series data), the present invention can assist the user in absorbing far more event related information than has otherwise been feasible. This improves user productivity and revenue generation, and may mitigate potential loss. Also, by leveraging emerging and converging data management standards, information flows can be efficiently automated. In the present invention, automation is important because it permits the simultaneous, congruent and real-time or pseudo-real time display of a vast array of disparate data sources thereby providing the user with actionable risk transfer opportunities before that information suffers material decay.

The present invention may graphically display financial data to a user, and may include a computer, one or more databases remote from the computer, a communications link configured to permit the computer to access the databases, and a user interface having a display device operatively coupled to the computer and configured to display information about a selected security on a display screen. As described herein, the term "security" is intended to represent a single security, two or more securities, such as in the form of a spread, for example, or other financial markets scenario, such as a hedge fund's performance. The information displayed may further include a timeline or time series representing past historical data for the security over a selectable period of time, a first group of catalysts mapped in parallel with the timeline of the past historical data corresponding to the security, and a second group of catalysts mapped to future data corresponding to the security.

A catalyst is a single event or group of events pertinent to the security presented on the display screen. Each catalyst is represented by an icon. Due to certain time scaling issues, each icon may correspond to more than one catalyst.

The icon may have one or more attributes that provide direct visual information to the user about the corresponding catalyst or catalysts if the data density is less than a predetermined value, meaning that the time scale selected is of a sufficiently small period of time so that the information can be displayed on the screen or is able to be "spread out" in an uncluttered manner, meaning there is sufficient room or "real estate" on the display to display the data to the user.

Conversely, the icon may only indicate the existence of the catalyst and a time frame of that catalyst if the data density is greater that a predetermined value, meaning that the time scale selected is of a relatively large period of time so that the information is "compressed" and cannot be displayed on the screen in an uncluttered manner. Thus, in this case, only the icon itself may be displayed without its underlying content showing. Of course, the underlying content is available using various drill-down techniques and user selectable switches and buttons (clicks).

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 1:
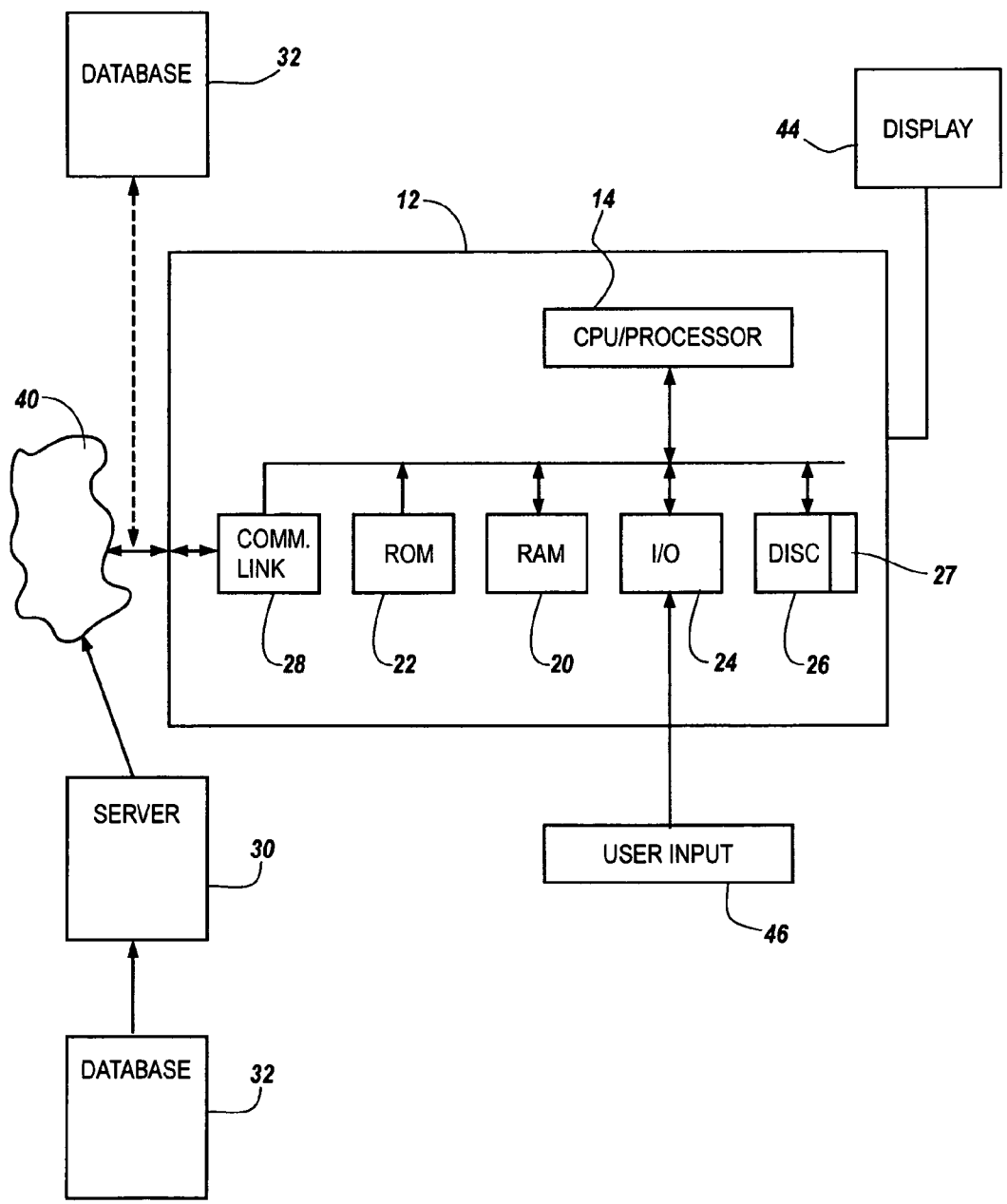
FIG. 1 is a block diagram of a specific embodiment of a computer system, according to the present invention.

Referring now to FIG. 1, the event driven financial analysis interface and system 10 may be implemented on a standard computer platform 12. The computer 12 may be a desktop, laptop, or notebook style personal computer, such as an IBM or APPLES® brand compatible personal computer. Preferably, the computer 12 is an IBM brand compatible personal computer, having for example, one or more microprocessors 14 running under Windows, UNIX, Linux, or any other suitable operating system. The computer, however, may be any computer, processor, central processing unit (CPU), microprocessor, RISC (reduced instruction set computer), mainframe computer, work station, single chip computer, distributed processor, server, controller, micro-controller, discrete logic device, remote computer, internet computer or web computer. The computer 12 is part of a computer system that includes various components that are known in the art.

The computer system 12 as shown in FIG. 1 may include known commercially available components, such as RAM 20 (random access memory), ROM 22 (read only memory), input/output ports 24, disc storage 26, database applications 27 and the like. As is known in the art, the various components of the computer system 12 are coupled to each other via one or more standard computer buses. Of course, multiple computers or multiple computer systems may be used to handle the processing and to distribute the processing load without departing from the scope and spirit of the invention.

Preferably, the computer 12 includes a communication link 28 to operatively coupled it to a remote server(s) 30 and/or to one or more databases 32. Preferably, the computer system 12 is also coupled to the internet 40 and may access the database via Internet link or other known communications interfaces or links. Alternatively, the computer 12, may be coupled via the communications interface 28 to a plurality of databases or information portals to obtain the necessary underlying data for display. However, some of the underlying information may be contained in the attached or self-contained database 27 that may reside on the hard disk 26. Any suitable hardware configuration may be sued to couple the computer to the database so that the computer is operatively coupled to the database(s), meaning that the computer is able to access the database(s) and obtain the required information. It is not material to the scope of the invention whether the database is remote from the computer or attached directly to the computer.

The computer is configured to graphically display financial data to a user on a display device 44 via user selection of a particular security or financial instrument. Of course, the display device 44 may be a stand alone "dumb" terminal remotely coupled to a computer, which remote computer drives the display and receive appropriate user comments, for example, from a click device 46, such as a keyboard, mouse, track pointer and the like.

In one specific embodiment, portions of the software of the present invention may be written in the language of C-Sharp, Version 1.1 by Microsoft, and in Visual Basic, Version 1.1 by Microsoft. The software development environment utilized may be provided under Visual Studio.Net, Version 2003. Various communication features and protocol may be written in accordance with XML Web Services, SOAP (Simple Object Access Protocol), and NET Framework, Version 1.1 by Microsoft. The database system is preferably accessed using Microsoft SQL Version 2000. Portions of the user interface and screen presentation software may be developed under Windows Forms, Version 1.1 by Microsoft. However, any suitable software may be used to implement the present invention.

Figure 2:
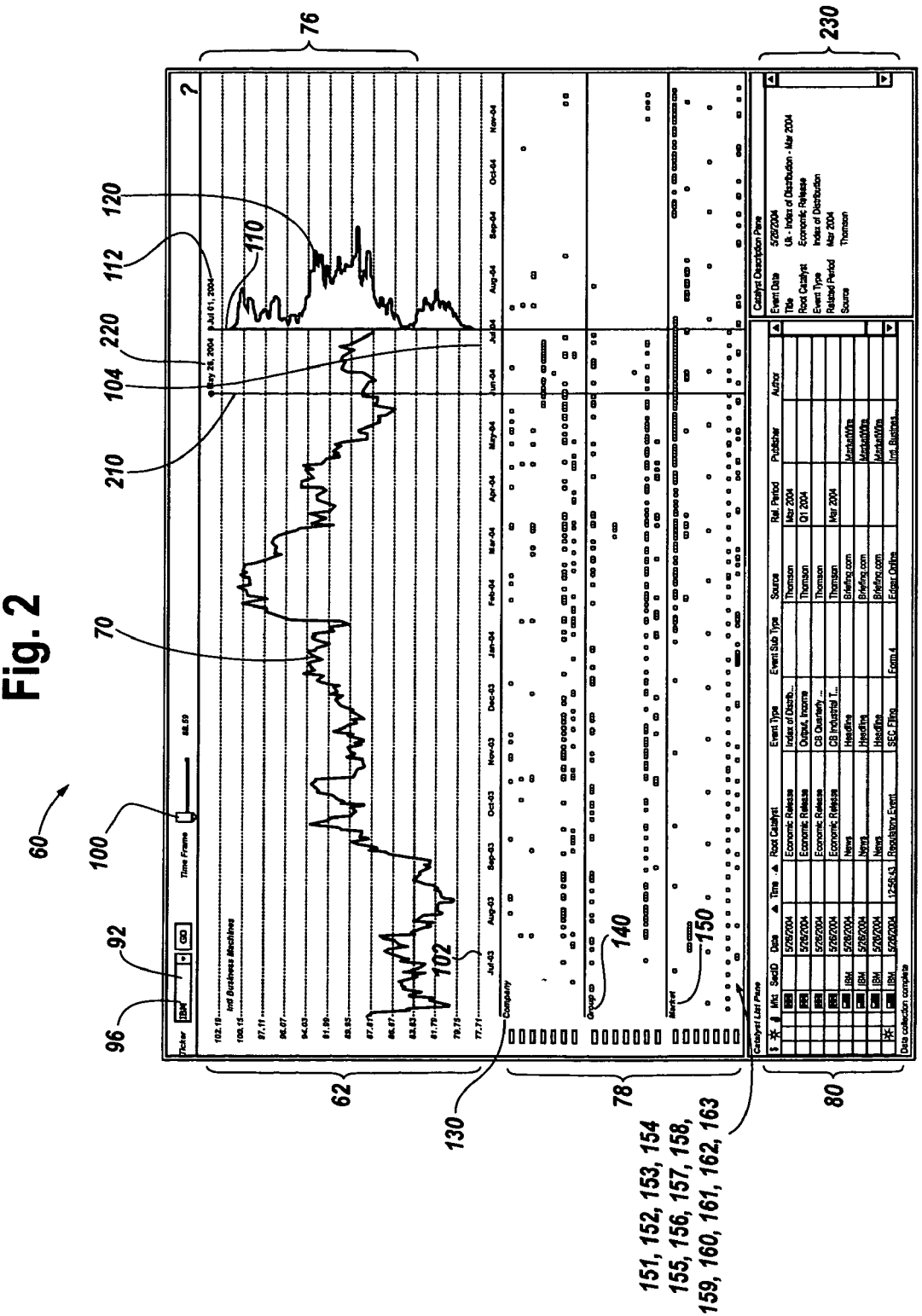
FIGS. 2-12 are pictorial representations of various views of the interface as presented to a user, which shows certain data in accordance with specific embodiments of the present invention.

Referring now to FIG. 2, an exemplary screen image display 60 is shown. This may also be referred to as a "dashboard." Although shown in black and white, various sections and symbols are presented in color to increase ease of use and identification of the information by the user. The display screen or interface 60 presented to the user preferably provides all information in a concise and user-friendly manner, and further is configured to display large amounts of information on a display screen in an organized and easily cognizable fashion. Preferably, the data is presented on a single display screen. This is advantageous and permits the user to view and select data without scrolling down through multiple screens of data. Alternately, multiple scroll-down screens may be provided if needed. The screen display 60 may include:

1) A time-scalable time-series charting and technical analysis window, also referred to as the history pane 62, which is preferably located in an upper left quadrant of the display screen. A time-series chart 70 is shown in this window which, in the illustrated figure, represents IBM corporation in a price-time chart. The user can enter any security identifier, such as a ticker symbol, and the chart shown is not limited to only a price-time chart. The time series line may, for example, represent a price chart, bond yield, volatility, spread of two securities, performance of hedge fund and the like;

2) A time-scalable future pane 76, which is preferably located in an upper right quadrant of the display screen;

3) A catalyst map pane 78, which is preferably located in a lower half-portion of the display screen 60. As mentioned above, a catalyst is an event pertinent to the security presented on the display screen, as will be described in greater detail below; and 4) A catalyst list pane 80, which may be configured to display a list of catalysts arranged in ascending or descending order. The catalyst list pane 80 is preferably displayed below the catalyst map pane 78 or as a separate window. Each of the above-identified components may have dependencies upon each other. Together, the history pane 62 and the future pane 76 may be referred to as the time-series panes. All of these components together may be referred to as the action window.

Figure 3:
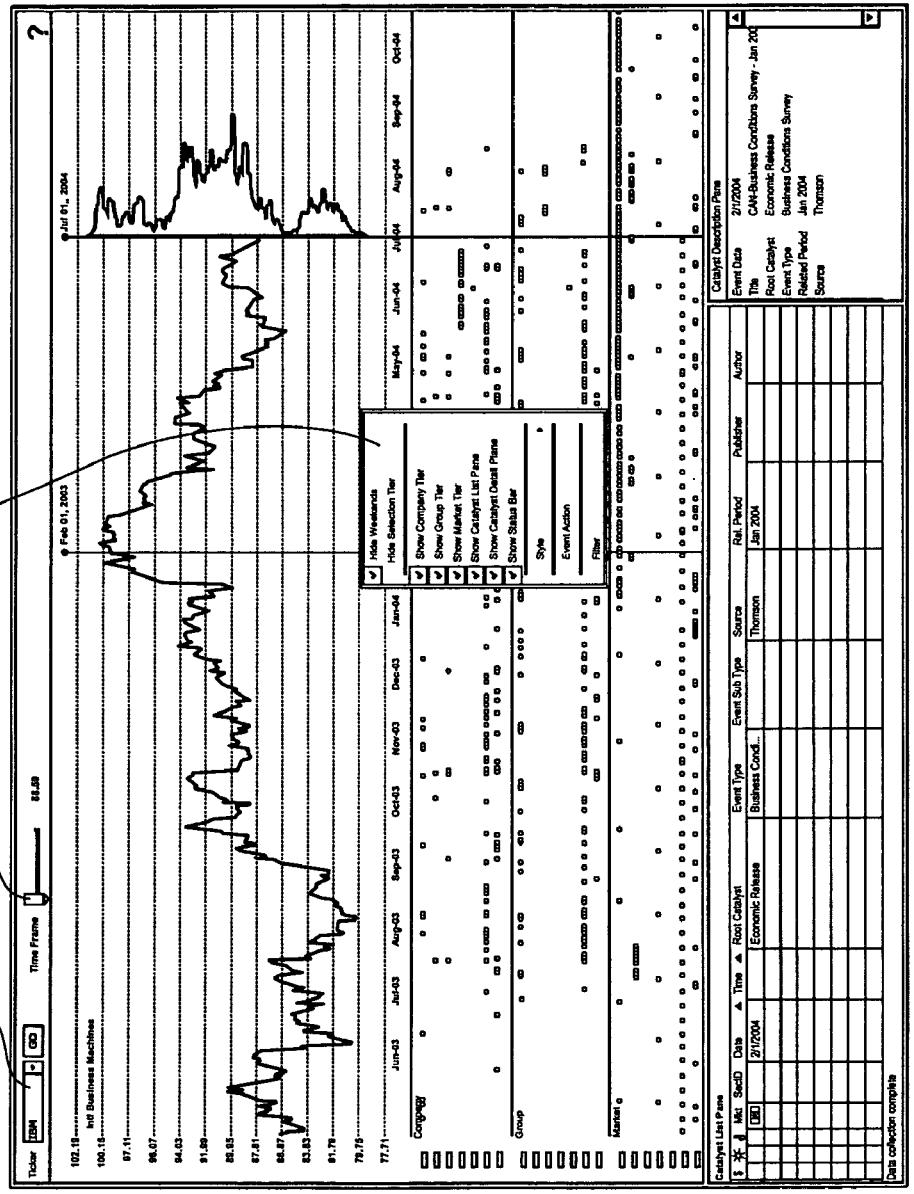
Figure 4:
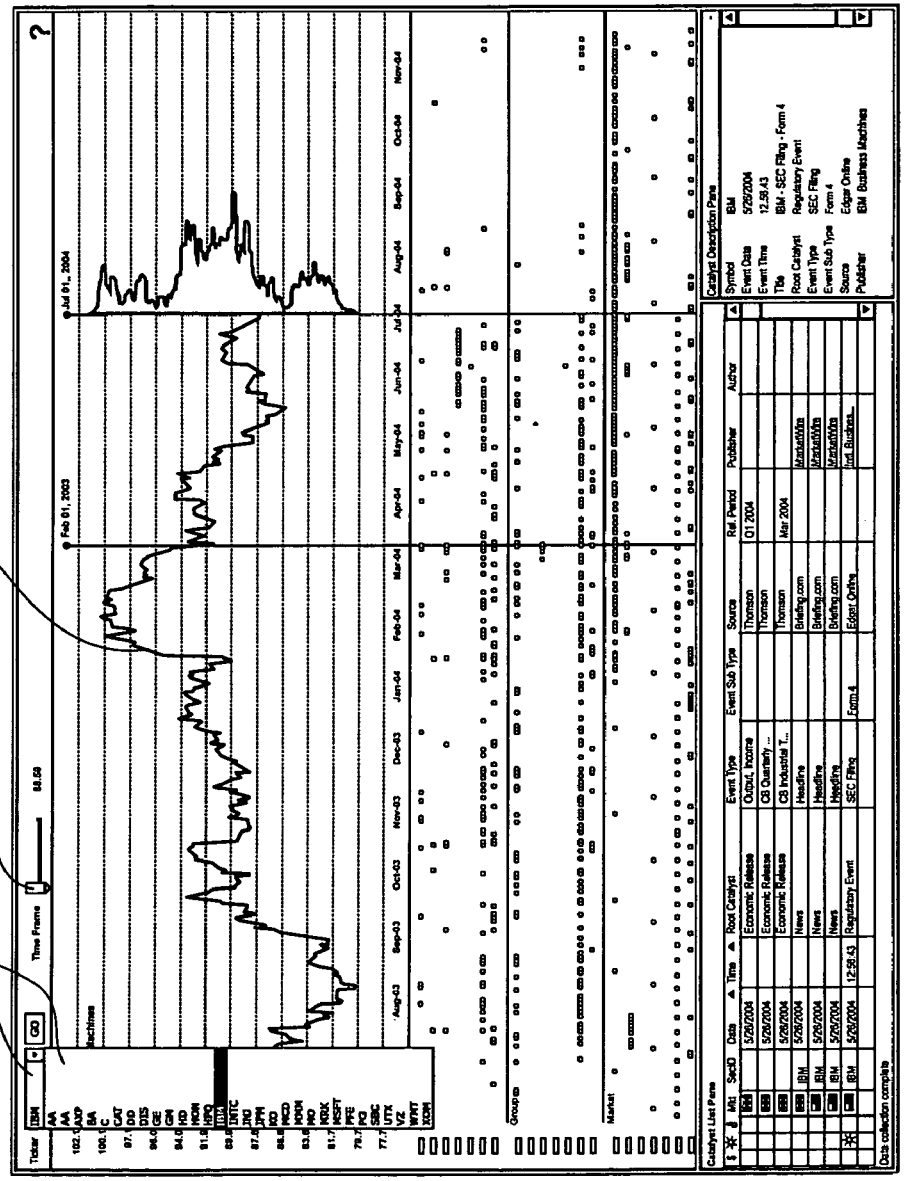

Note that the location of any of the various display panes may be resized, or hidden in accordance with user preference. With regard to configuring various aspects of the display screen 60, a setup menu 90 shown in FIG. 3 is just one example of a menu for controlling the visibility or invisibility of certain panes of data. Additionally, various functions may be controlled by the setup menus to control the look and feel of the interface and thus, control the display of data. Each of the above-described primary components of the system may have detailed configuration options. Additionally, such setup menus may include options involving external tools and software applications, such as Microsoft Outlook, Blackberry synchronization, and the like.

History Pane

The time series chart 70 shown in FIG. 2 of the specific illustrated embodiment represents a price chart for IBM. Of course, the display of the time series chart 70 is not limited to a price chart, and may indicate many different financial data types, such as bond yields, volatility of various securities, divergence of two securities, and the like. Preferably, the history pane 62 defaults to a price graph of the active security entered into a security identifier entry box 92. Alternatively, the history pane 62 may monitor spreads and other forms of time series information. The type of price graph (OHLC, close-only, etc.) and the time period may be user-defined from a list of options located in special setup menus. Other technical indicators, such as moving averages and trend lines, may also be shown in the history pane 62 if selected from the setup menus.

Security Identifier Entry Box

As shown in FIG. 2, a ticker symbol may be shown in the security identifier entry box 92. This box drives the information displayed in the action window. As shown in FIG. 3, in operation, the user places the curser over the down arrow and clicks to expand the box to show, for example, all of the ticker symbols for available securities. Although only equities are shown in the illustrated figure, the present invention is not limited to displaying only equities. Any available financial instrument, regardless of asset class or geography, may be shown. The security identifier entered into the security identifier entry box 92 may be referred to as the selected or active security. Operation of security identifier box 92 may also include features to track a number of previous selected entries and/or allow for drag-drop capabilities.

Alternatively, if the user does not know the security identifier, but knows the name of the particular entity, the user can enter an alpha-numeric string 96 into a security identifier search box (not shown). From here, the user may be prompted until the desired security identifier is designated. Alternately, the user may "drag and drop" a security identifier from another section of the present application, such as a security price monitor screen, into the security identifier box 92. In either case, the appropriate time-series chart 70 along with the catalyst map 78 of the chosen security is displayed.

Time Scaling

As shown in the above figures, a time scaling button 100—or other function, such as a scroll bar (FIG. 2) permits the user to scale the time period to be displayed in the time panes 62, 76, 78. The time scale choice will influence the symbology illustrated in the catalyst map pane 78. The period of time displayed is selectable by the user and is selectively compressible and expandable by adjusting the time frame button or related function 100. For example, longer time periods will typically yield smaller symbols or icons, such as the dots shown in the catalyst pane 78, because the data density is greater. Shorter time periods will typically yield larger symbols, such as descriptive icons, because the data density is reduced permitting the display of more descriptive and "texturized," and most likely, larger icons. All icons preferably correspond to color codes and indicate secondary attributes, such as ranking, through movement, such as blinking. Any time period may be selected, for example 24 hours (1 day), 7 days (1 week), 22 days (or 1 month), 252 days (or last 12 months), multiple years or maximum time period in the database.

As illustrated in FIG. 2, the time scaling button or related function 100 is set to the maximum time period (left most position in this specific illustration) and the corresponding time series (or price chart in this specific embodiment) displays the price of the IBM security from July 2003 (102) to July 2004 (104). Of course, all data available from the database may be displayed. Now referring to FIG. 5, however, when the time scaling button or related function 100 is set to the minimum time period (right most position in this specific illustration), the corresponding time series 70 displays the price of the IBM security from Jun. 24, 2004 to Jun. 30, 2004.

Figure 5:
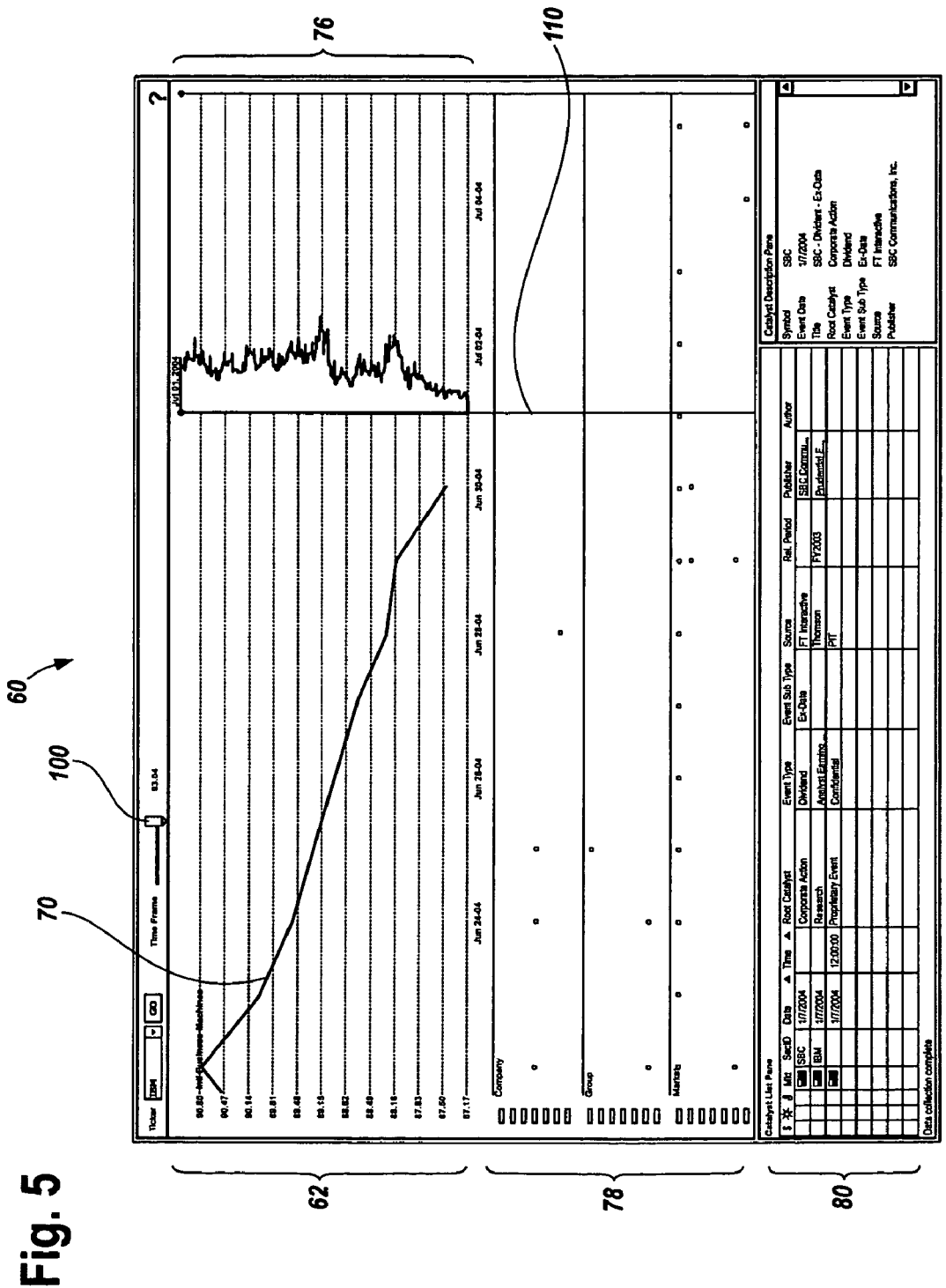

Referring now to FIGS. 2 and 5, the ratio between the history pane 62 and the future pane 76 may be adjusted by moving a Present Time Bar 110, as described below. Vertical resizing of the time series panes may also be performed by the user. The display 60 may also include horizontal and vertical gridlines, and minor and major gridlines may be used for greater ease of visual interpretation. Time scaling may be performed in real time, or at least in pseudo-real time, depending upon the time delay of the database. Some databases have a latency of twenty minutes or more, while the latency of others can be measured in milliseconds.

The present time bar 110 is preferably represented by a thin, vertical and highly visible line between the historical time series pane 62 and the future time-series pane 76, thus allowing for close proximity of the two panes. The present time bar 110 is movable horizontally to allow the user to change the ratio between the amount of historical data viewed and the amount of future data viewed. The present time bar shows the "present time," 112 which is shown as Jul. 1, 2004 in the specific embodiment of the figures, as if the user were sitting in front of the display on Jul. 1, 2004. Accordingly, the selectable period of time to be displayed on the display screen 60 can be variably divided and varied by the user to show past historical data on the left side of the screen, and future data on the right side of the screen.

The position of time series chart 70 and corresponding catalyst data 78 to the left of the present time bar 110 represents past historical data for the security, while corresponding catalyst or events data to right of the present time bar 110 represents future data, as will be explained below. The catalysts or events shown to the left of the present time bar 110 are catalysts mapped in parallel (vertically) with the time series of the historical data corresponding to the security. The catalysts to the right of the present time bar 110 are mapped in the same scale as those to the left of the Present Time Bar 110. (i.e., in parallel (vertically) to future data corresponding to the security).

As used herein, the term "parallel" is not used in the geometric sense. Rather, the term is intended to mean that the scale or time scale between the catalyst and the time line or time series chart is the same. That is, the time series chart is a graph having a time base on the "x" axis (horizontal axis), and the catalysts are shown below the time series chart mapped along the time base or x-axis use the same time scale and thus, directly correspond in time to points along the time series chart. Thus, the catalysts are said to be "mapped in parallel" with or "mapped vertically" with the time series chart. This is true for catalysts shown in the all "panes" of the invention, including the history pane and the future pane, discussed in detail below.

Figure 6:
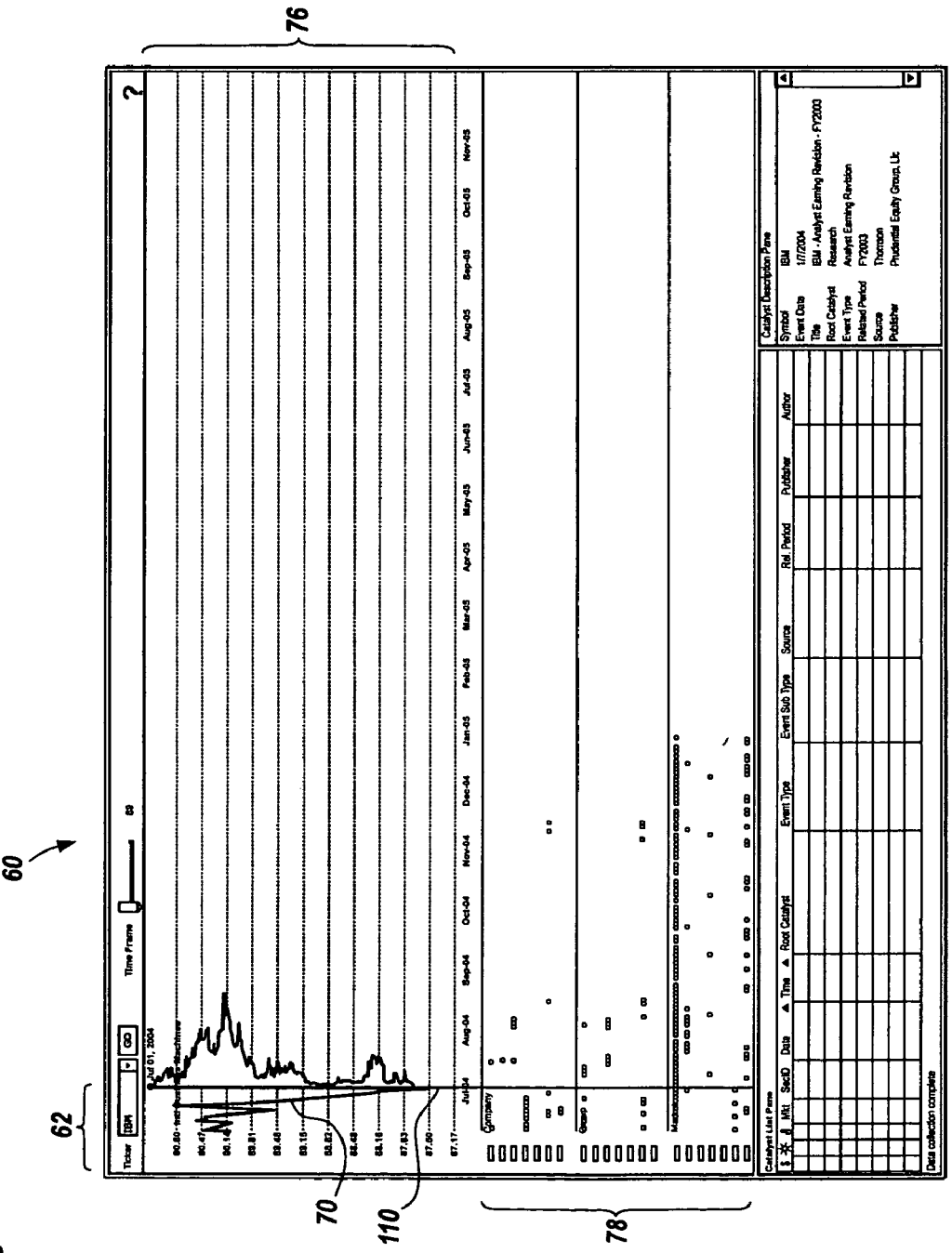
Figure 7:
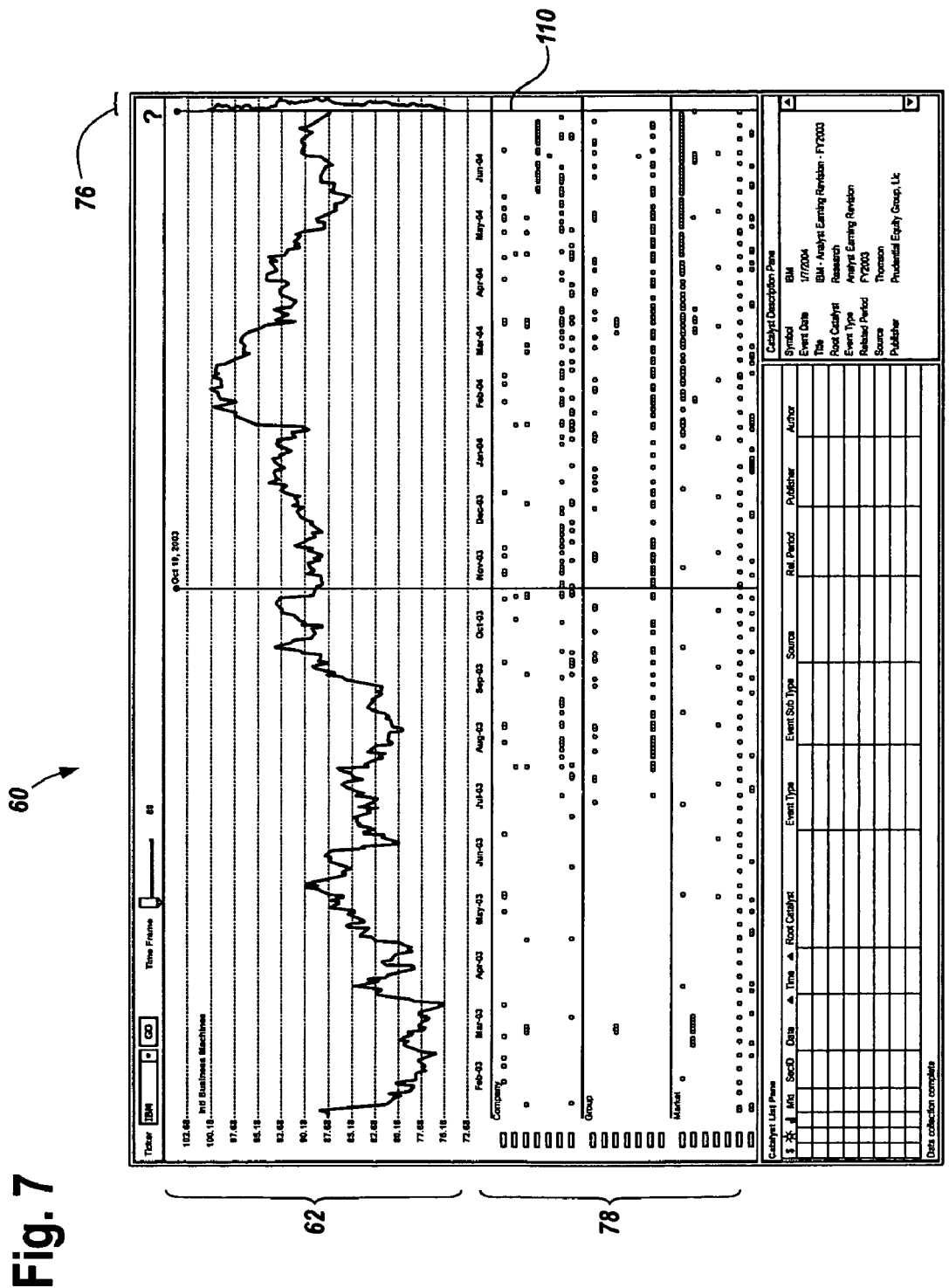

As mentioned above, the present time bar 110 may be movable horizontally to perform a scrolling function as well as serving as an indicator of the present time. The boundaries of this movement will allow the entire history pane 62 to become hidden, meaning that the present time bar 110 can become the left vertical axis of the action window. Conversely, the entire future pane 76 may become hidden, meaning, the present time bar 110 can become the right vertical axis of the action window. In other words, by movement of the present time bar 110, the future pane 76 may be viewed without the history pane 62, as shown in FIG. 6, and the history pane can viewed without the future pane, as shown in FIG. 7. Alternatively, a toggle button (not shown) may be provided that fully collapses the history pane 62 and maximizes the future pane 76, and vice versa.

Future Pane

Referring back to FIG. 2, the future pane 76 may include a horizontal histogram 120 related to the active security, and also may include indications of expected volatility and other features. The histogram 120 is essentially a vertical representation of the time series 70 in the history pane 62, but turned on its side. This may indicate support resistance line and trends. Where there is a high density of a specific price, there may be price support and resistance. The histogram 120 may be used predominantly for "technical" trading. Alternatively, the user may choose to leave the entire future pane 76 blank if the data presented is not pertinent to the analysis at hand. Obviously, events in the future cannot be known, but events scheduled to take place (or likely to take place) in the future are known, and thus are displayed in the future pane 76 as catalysts. There are three methods for mapping the date and time of future events: 1) direct announcement by some entity, 2) business rule, regulatory rule or other due date, and 3) inference or estimation based on past behavior.

Catalyst Pane

The catalyst map pane 78 is preferably displayed directly below the history pane 62. The catalyst map pane 78 provides, in part, for the ability of the present invention to display a very high density of information delivered in a visual format. The catalyst map pane 78 permits the rapid or real time acquisition of information from multiple disparate data sources and data types by the user, and permits detailed and sometimes obscure events to be mapped into the future.

The catalyst map pane 78 may visually represent as many catalysts that have a date and/or time stamp, independent of any expectation of the causal relationship between the event and subsequent security price movement. For example, one catalyst may merely represent a broker's technology industry conference, or annual meeting of the shareholders. The catalyst map pane 78 may include at least one, and most likely multiple catalyst tiers, which are preferably selectable by the user. Each catalyst tier may be hidden and unhidden, each root catalyst category may be hidden and unhidden, and each unique catalyst may be hidden, unhidden (or otherwise filtered) and manually ranked or prioritized by the user. As shown in the specific illustrated embodiments, only three catalyst tiers are shown, namely the company tier 120, the sub-industry group tier (group) 140, and the market tier 150. Preferably, the default setting will cause the company tier 130 (company or security specific events), the group tier 140 (sub-industry or most highly correlated business grouping) and the market tier 150 (the primary economic market events for the active security) to be displayed.

In addition to the three default displayed catalyst tiers 130, 140, 150, eight additional tiers (151, 152, 153, 154, 155, 156, 157, 158) may be provided for a total of eleven basic or most relevant catalyst tiers, with only three shown in the illustrated embodiments. However, any suitable number of catalyst tiers may be shown or selected as being pertinent to the security displayed. The following will describe the sixteen catalyst tiers, but of course, not all possibilities are described herein.

1. Company tier—the company tier 130 may include events that are specific to a particular entity or company, typically, the security entered into the security identifier entry box 92, namely the active security.

2. Group tier—the group tier 140 may relate several different types of grouping (such as competitors, peers, partners, suppliers and customers), but will typically include events that are related to all entities or companies in the same sub-industry group (or most highly correlated grouping of competitors) as the active security (as determined by user designation or company categorization taxonomy, such as MSCI GICS).

3. Market tier—the market tier 150 may include events that are related to the active security's primary economic market. For example, a security with its primary business in the United States will have events affecting the US economy illustrated in this tier. Examples include holidays, expiration dates and major economic indicator dates.

4. Economic Sector tier—the economic sector tier 151 may include events that are related to all entities or companies in the same economic sector as the active security (as determined by user designation or company categorization taxonomy, such as MSCI GICS).

5. Industry Group tier—the industry group tier 152 may include events that are related to all entities or companies in the same industry group as the active security (as determined by user designation or company categorization taxonomy, such as MSCI GICS).

6. Industry tier—the industry tier 153 may include events that are related to all entities or companies in the same industry as the active security (as determined by user designation or company categorization taxonomy, such as MSCI GICS).

7. Sub-Industry tier—the sub-industry tier 154 may include events that are related to all entities or companies in the same sub-industry as the active security (as determined by user designation or company categorization taxonomy, such as MSCI GICS).

8. Partner tier—the partner tier 155 may include events that are related to all entities or companies that represent partners of the active security (as determined by the user or by third party taxonomy, such as RevereData Hierarchy).

9. Suppliers tier—the supplier tier 156 may include events that are related to all entities or companies that represent suppliers to the active security (as determined by the user or by third party taxonomy, such as RevereData Hierarchy).

10. Customers tier—the customer tier 157 may include events that are related to all entities or companies that represent customers of the active security (as determined by the user or by third party taxonomy, such as RevereData Hierarchy).

11. Country, Region, or Geographic Group tier—this tier 158 may include events that are related to a specific country, region, or group of economies, such as NATO or NAFTA.

12. Global tier—the global tier 159 may include events that are related to a user-defined or otherwise defined set of global economic markets, such as the "G7" countries.

13. Portfolio tier—the portfolio tier 160 may include events that are related to a user defined portfolio of securities.

14. Topical tier—the topical tier 161 may include events that are related to a topic and not necessarily to a security. The source of this data and content will typically be newspapers, research reports and other forms of media. In this special case, the user may opt to view the catalyst map as a time series that is independent of a particular security, perhaps even with the time series panes hidden.

15. Technical Indicator tier—the technical indicator tier 162 may include events that are related to technical indicators, such as volume levels, moving averages, trend lines or other forms of technical indicators.

16. Custom tier—the custom tier 163 may include events that are proprietary to the user or a user group. Proprietary catalysts can be entered by setting up a special item within a linked calendar application, such as for example, Microsoft Outlook.

Figure 8:
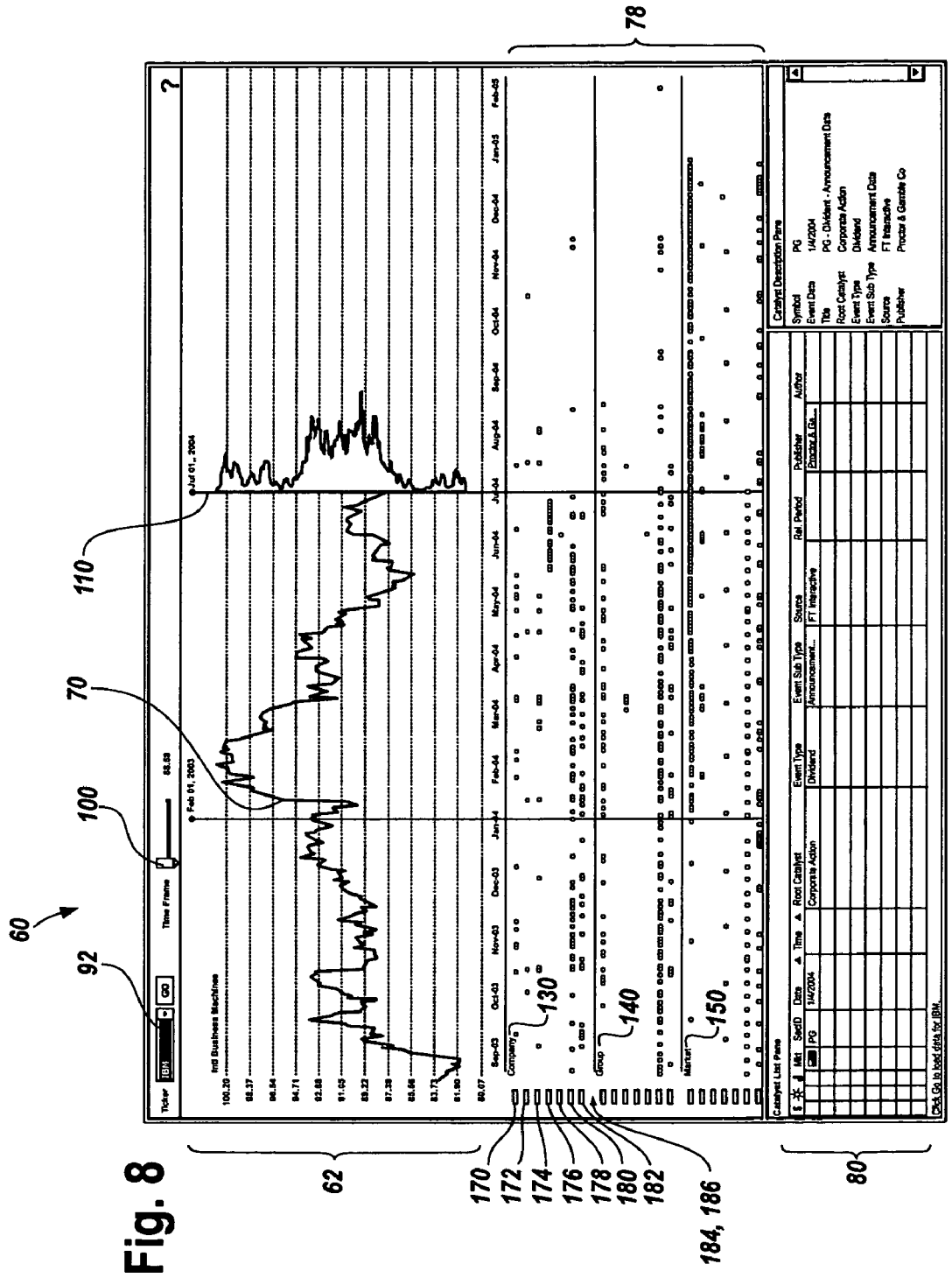

Referring now to FIGS. 2 and 8, FIG. 8 is shown for purposes of clarity by omitting some of the detail shown in FIG. 2. With respect to the three illustrated catalyst tiers 130, 140, 150, the first displayed tier, namely the company tier 130, shows several rectangular bars at a left edge of each catalyst map tier. This is also true for the second tier, namely, the group heading 140, and the third tier, namely, the market tier 150. Each of these rectangular bars represents a root catalyst category and may be a designated by a unique color. Note that these indicators are displayed on a color display and such distinction cannot be seen in the black and white figures. Depending upon user selection and available screen size, more or less than seven bars (as currently shown) may be indicated at the left edge of each catalyst map tier.

Each catalyst tier 130, 140, 150 (and 151-163) may incorporate its own unique catalyst taxonomy. Some of these taxonomies will be the same among the various catalyst tiers, while some tiers may contain different catalyst identifiers. The user preferably retains discretion as to which catalyst tiers are visible.

Figure 9:
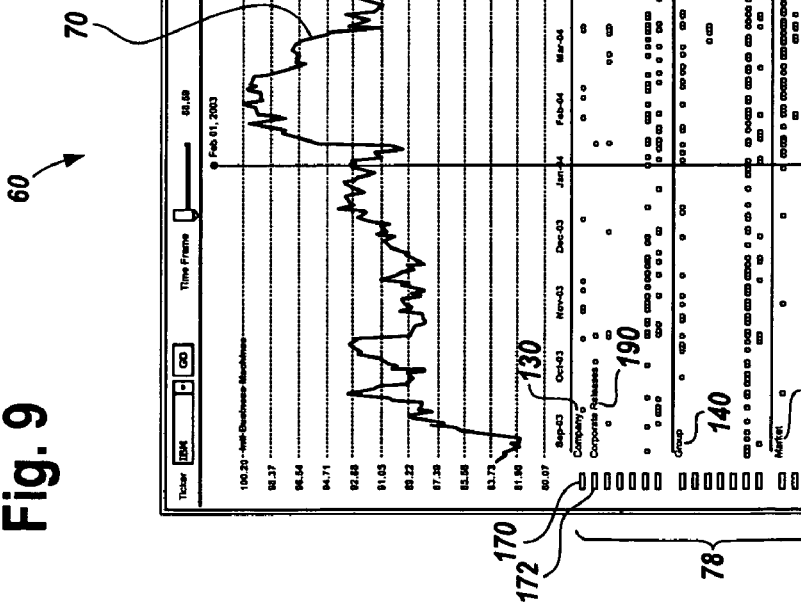

As shown in FIGS. 8-9, for example, when the cursor is placed over the second rectangular bar 172 in the company tier 130, pop-up text is displayed to indicated the type of catalyst category in that line of catalysts. The same is true for each of similar bars in each catalyst tier. As shown in the illustrated embodiment of FIG. 9, the second rectangular bar under the company tier 130 displays pop-up text of "corporate releases" 190. This means, for example, that the various dots or icons shown across the catalyst pane 78 in parallel and in line with that bar correspond to various corporate release events. As shown in FIG. 8, the following types of catalysts or events may be displayed:

1. Corporate Actions 170
2. Corporate Releases 172 (including earnings related)
3. Economic Releases 174
4. Meetings 176
5. News 178 (including all forms of media, such as newspaper, magazine, television, etc.)
6. Proprietary 180 (or Custom) Events
7. Regulatory Events 182 (including SEC filings)
8. Research 184 (including sell-side, buy-side, independent and proprietary)
9. Structural Events 186 (including expirations and holidays)

The above list of nine catalysts (170-186) may be referred to as the "root category" of the catalyst. Of course, the above list of categories may be expanded to encompass any suitable event or occurrence. Further, the order of the catalysts may be varied to suit user needs.

Any event or catalyst deemed important to have on hand for display and access by the user may be used as a subcategory. The list of subcategories is essentially unlimited, and the chart below provides some of the subcategories corresponding to the nine root categories of catalysts contemplated. Any data present in the database may be displayed. The chart below shows a partial list of subcategories for the company tier 130 relative to a particular company. The Corporate Event, Capital Change and Distribution categories below correspond to Bloomberg's Corporate Action CACS Categories. The same or similar categories of catalysts may be used in the other catalyst tiers.

| Corporate Events |
| --- |
| Name Change |
| Domicile Change |
| State of Incorporation Change |
| Ticker Change |
| ID Number Change |
| Warrant Terms Change |
| Equity Listing/Delisting |
| Change in Listing |
| Variable Interest Reset |
| Voting Rights Change |
| Currency Quotation Change |
| Reconvention/Redenomination |
| Corporate Meeting |
| Capital Change |

| Capital Change |
| --- |
| Merger |
| Spin-Off |
| Bankruptcy Filing |
| Stock Buyback |
| Equity Offering |
| Par Value Change |
| Acquisition/Divestiture |
| Installment Call |
| Reclassification |
| Rights Offering |
| Debt Redemption/Call |
| Debt Offering/Increase |
| Debt Reduction |
| Debt Repurchase/Tender |
| Conversion Terms Refix |
| Exercise Terms Refix |
| Funged Issues |
| Variable Principal Reduction |
| Pay-in-Kind |
| Extendible Issues |
| Debt Redemption/Put |
| Exchange Offers |
| Debt Offering/New Issue |

| Distributions |
| --- |
| Liquidation |
| Cash Dividend |
| Stock Dividend |
| Capital Distribution |
| Stock Split |
| Coupon Payments |

| Earnings |
| --- |
| Earnings Release Date |
| Earnings Warning/Pre-announcement |

| Analysts |
| --- |
| Research Comments |
| Research Report |
| Upgrade/Downgrade |
| Reiterated Recommendation |
| Earnings Estimate (Initiation and Revision) |

-continued

| Filings |
| --- |
| Filing Deadlines |
| 10-Q, 10-K, other forms |
| Equity Filing Date |
| Other Filings |

| Credit Ratings |
| --- |
| Credit Warning |
| Credit Outlook |
| Credit Rating Change |

| Meetings and Conference Calls |
| --- |
| Earnings Conference Call |
| Analyst Conference Call |
| Conferences |
| Conference Presentation |
| Corporate Conference Call |
| Company Visit |
| Analyst Meeting |
| Syndicate Roadshow |
| Other Brokerage |
| Shareholder Meeting |
| Fed Agency Meeting |
| Fed Government Meeting |
| Other Regulatory Meetings |

| Technical Indicators |
| --- |
| Volume Alerts |
| Price Alerts |
| Other Technical Events |

| Other |
| --- |
| Product News |
| Quiet Period |
| Option Expiration |
| Lockup Periods |
| News |
| Other Corporate |
| Management Change |
| Index Membership (Add/Delete) |
| Insider Transactions |
| Custom |

Figure 10:
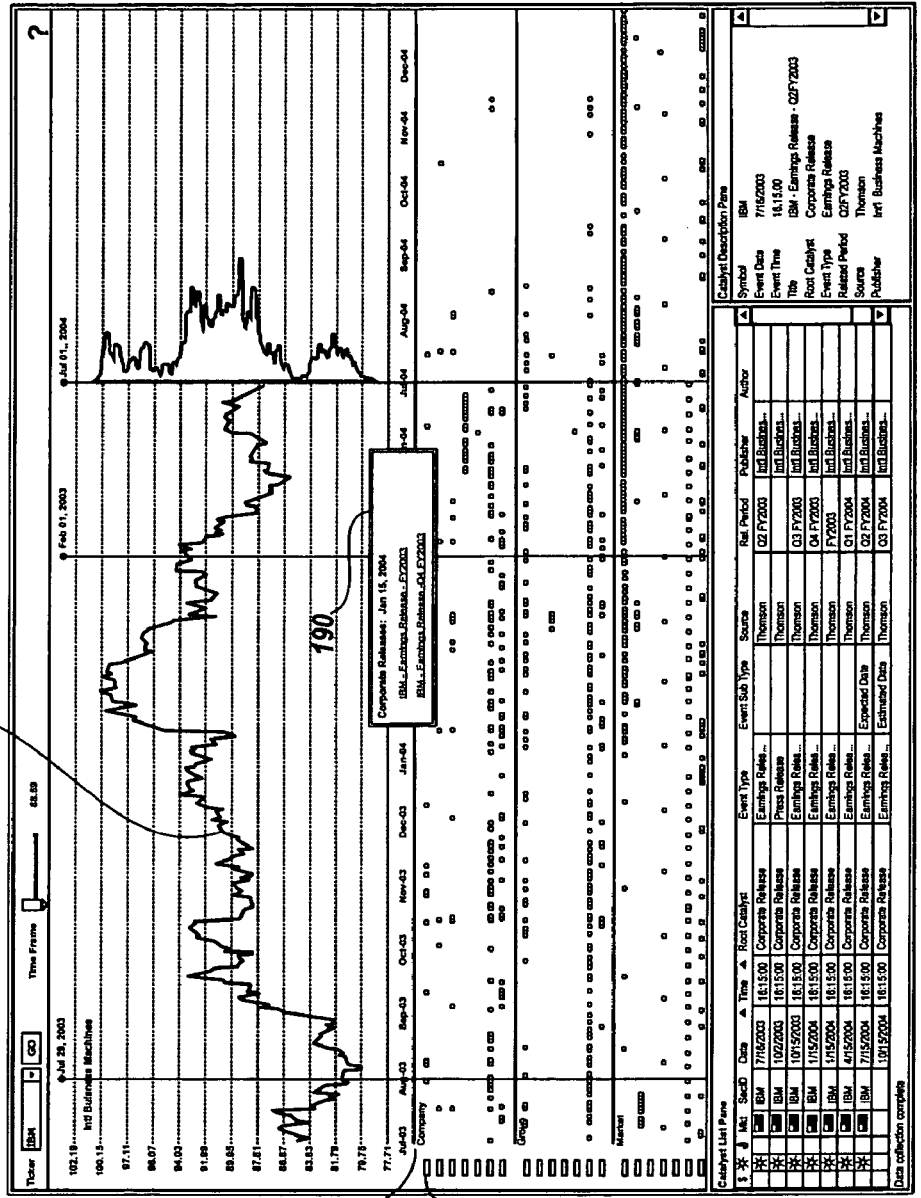

As can be easily seen, the present invention provides a very high density of "event-related" information, preferably on a single computer screen display, with a variety of drill down options. An event may be assigned, for example, to one of the nine root categories 172-186 in accordance with the subcategories. For example, as shown in FIG. 10 in the company tier 130, under corporate actions 170 (first rectangular bar in tier 130), each icon or dot shown across in line with corporate actions 170 may correspond to a variety of corporate releases. When the user hovers the cursor on the icon in the row corresponding to corporate releases 170, a pop-up window 196 is displayed corresponding to Jan. 15, 2004. The same is true for all icons in the catalyst map pane.

Figure 11:
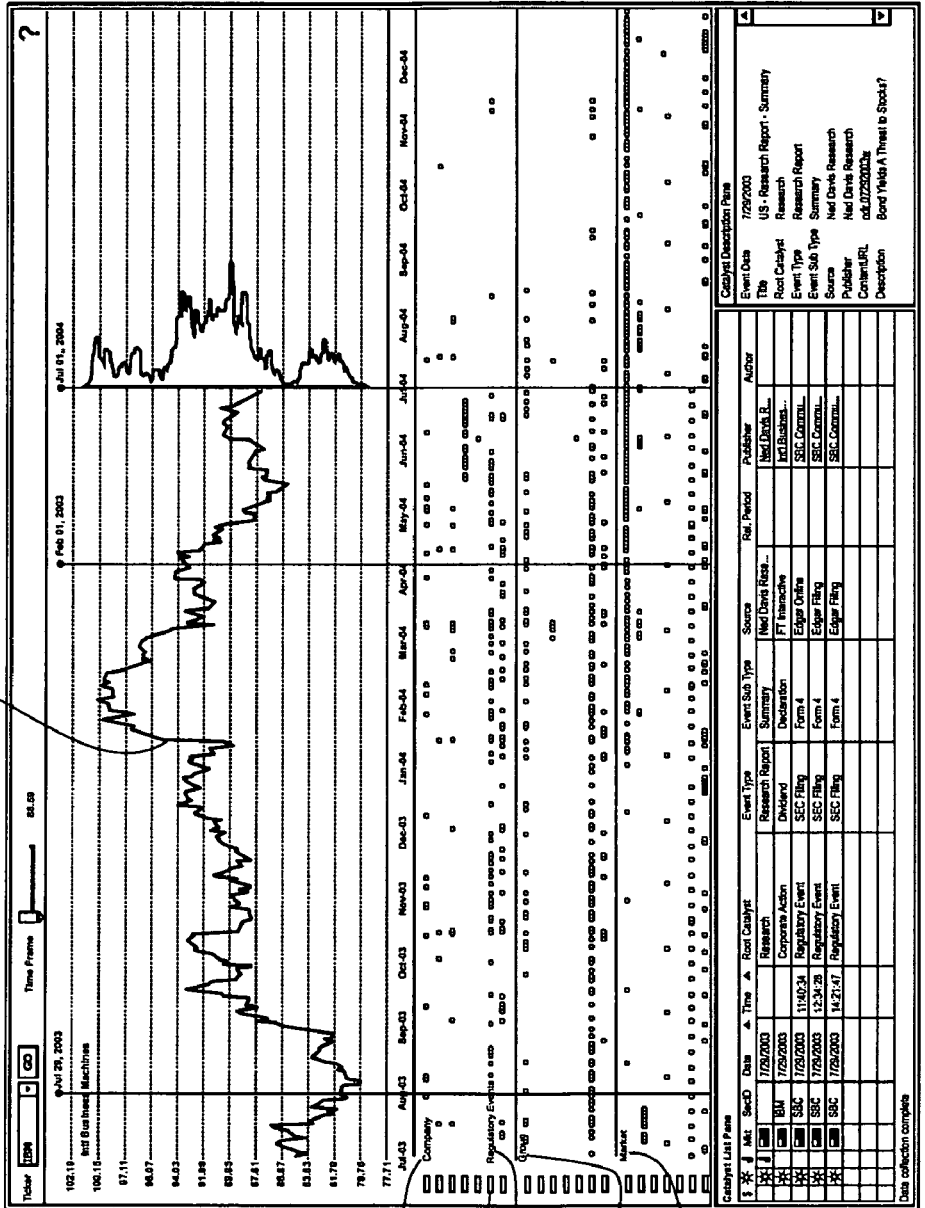
Figure 12:
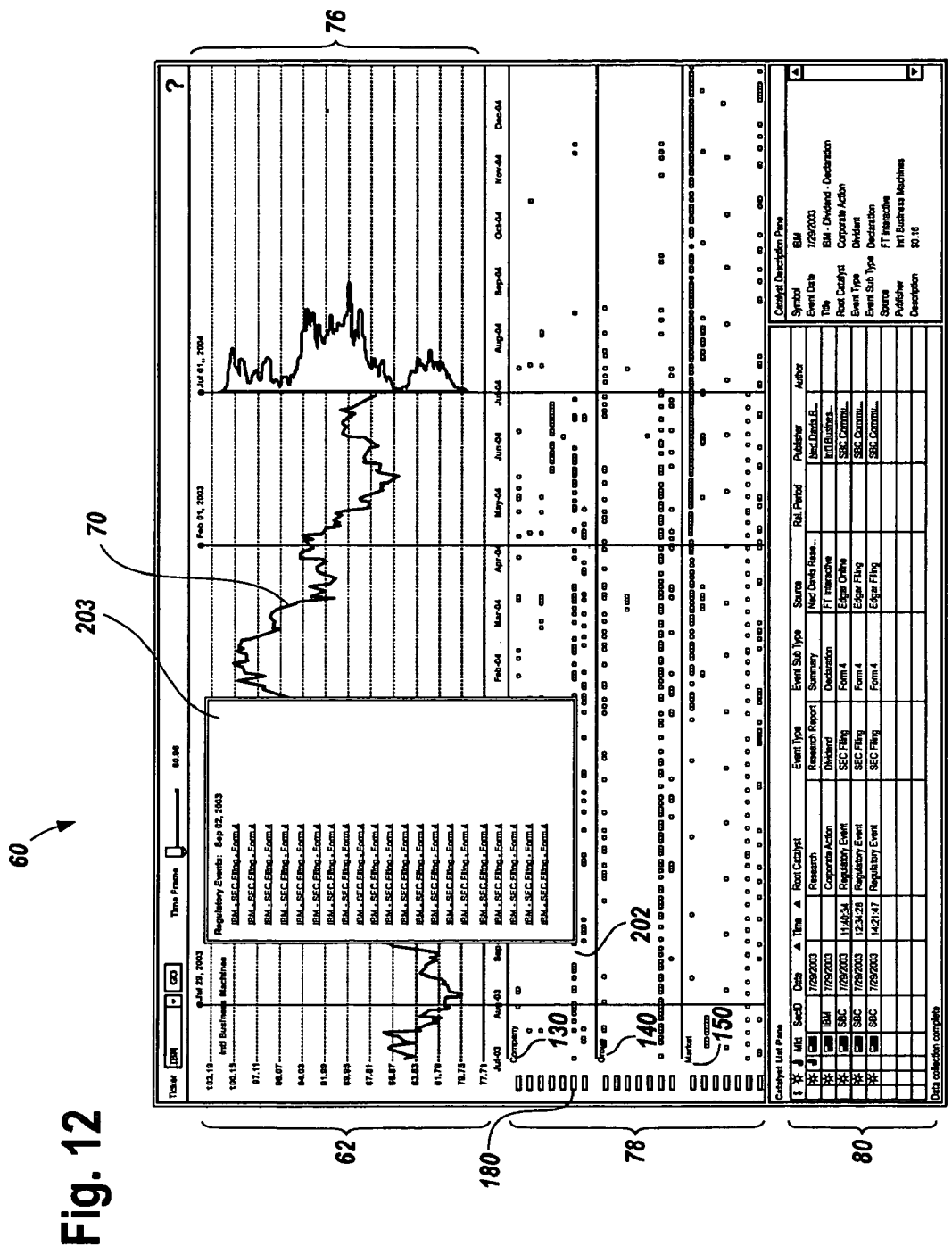

Note that depending upon the time scale, an icon may appear as a dot, however many catalysts or events may be represented by that icon. The catalyst is only shown as a dot or other small symbol to avoid cluttering the display screen in this specific embodiment. As shown in FIG. 11, the user may, for example, place the cursor over the sixth rectangular bar 180 in the company tier 130. This represents the category of regulatory events that correspond to the active security, as shown in the corresponding pop-up text 200. When the user hovers the cursor over the specific icon 202 (FIG. 12) in the line of catalysts represented by regulatory events, a pop-up window 203 is displayed, as shown in FIG. 12, which provides further detail for the selected regulatory event, and further indicates that on Sep. 2, 2003, multiple filings of "SEC-Form 4" occurred. It would not be feasible, at this time scale, to display those multiple events by the icon itself because the display would be too cluttered to be useful to the user. Thus, if the data density is too large, meaning that the period of time selected by the user is too large or encompassing (i.e., the time scale is too large or greater than a user defined value), the icon may be a point or single indicator, which provides no direct information by itself, other than what root category of which it is a member. Rather, it only indicates the existence of the catalyst and its time frame, but no real context. Determining whether to directly display the information relative to the icon is subjective and also depends on the type and size of the display and the amount of data corresponding to the catalyst. For example, if several months worth of data are displayed to fill the screen, in most circumstances there would most likely be too much data so that each icon itself could not provide the direct information to the user. Rather, the icon would only be shown as a dot or point or other small visible indicator.

Conversely, if the time scale is "spread out" under user control, meaning that the period of time selected by the user is fairly small, perhaps a few days or a week, the data density may be sufficiently low so that the icon itself may contain or show more of the underlying data directly to the user. In other words, the icon itself may become more "texturized," and therefore, provide direct information to the user by virtue of certain attributes, such as color, geometric shape, size, representational figure, movement and the like. For example, the icon, rather than being a dot, may appear as a small image of a telephone (not shown) to indicate that an analyst conference call has or will occur.

Catalyst List Pane and Catalyst Description Pane

Referring back to FIG. 2 the Catalyst List Pane 80 may also be provided, preferably below the catalyst tiers 130, 140, 150. The user may view a static or real-time chronological list of catalysts by opening and viewing the Catalyst List Pane 80. The Catalyst List Pane 80 may be part of the active window or may be a separate window. Preferably, there are at least three methods for activating the Catalyst List Pane 80: 1) opening and position the reference time bar 210, 2) clicking on any of the rectangular root catalyst category bars (170-186 and others, and 3) clicking on icon in the catalyst map pane.

The Catalyst List Pane 80 may provide ranking in ascending or descending order on any catalyst or data field in the database. As shown in FIG. 2, a thin vertical line 210, referred to as the reference time bar, may be moveable by the user under cursor control (or by clinking/holding the left or right arrow keys on the keyboard). The catalyst list pane 80 is configured to display all of the catalysts that the reference time bar 210 intersects, across all catalyst tiers. That is, if the reference time bar 210 is positioned at May 26, 2004, as shown by reference number 220 in FIG. 2, then all catalysts occurring in that time frame, and across all catalyst tiers, are displayed in the catalyst list pane.

Additional detail may be shown for each entry listed in the catalyst list pane 80 by clicking on a row in the catalyst list pane 80. When the user clicks on a particular row of data in the catalyst list pane, that row will be highlighted, although such highlighting is not shown in the screen print of the figures. For the particular row highlighted, additional detailed information may be presented to the user in the Catalyst Description Pane 230, shown in the illustrated embodiment to the right of the catalyst list pane 80, as described in further detail below

Data and Content Access

Note that the present invention does not generate the underlying data and content. Rather, all information displayed is obtained from external providers via pre-configured access to various databases. However, many levels of data access are available according to the user's need. As a first level of data access, the display screen is used as an event monitor. By viewing the screen presentation in light of the various taxonomies and use of color, icons, and other symbology, the user can quickly understand what types of events have occurred in the past, and what types of events are expected or scheduled to occur in the future, including the date and time these events are expected to occur. Of course, the timing of these events may be modified by the information source. In that regard, the present invention may also display a unique symbol (not shown) to illustrate that an event has been modified and/or is estimated.

A second level of information may be available to the user by "hovering" the cursor over any of the symbols in the catalyst map. Through the use of "smart tags," brief details about the catalyst or catalysts (depending on time scale) will appear, much like a "comment" or pop-up window as previously discussed with regard to FIG. 12. These comments are automatically generated based on the corresponding metadata contained in the underlying database information. In fact, these comments will typically be a concatenation of a subset of the corresponding metadata.

A third and more detailed level of information can be accessed by the user by clicking on any of the icons in the catalyst map, or by clicking on any one of the links contained inside the corresponding pop-up window. At this level, the full set of metadata or user defined subset of metadata, which will typically be greater than that illustrated at the previous level of information, may be displayed in the Catalyst List Pane 80 and/or the Catalyst Description Pane 230. In the scenario where multiple events are represented by a single icon in the catalyst map pane, clicking on that icon may list all of the corresponding events in the Catalyst List Pane 80, the first of which is listed in the list in the Catalyst Description Pane 230. Subsequently, clicking on a single catalyst or row (other than the first) within the Catalyst List Pane 80 may activate the Catalyst Description Pane 230 and display all available metadata of the corresponding catalyst. In the scenario where a single event corresponds to a single icon, the act of clicking the icon (or corresponding link within the corresponding pop-up window) may activate both the Catalyst Link Pane 80 and the Catalyst Description Pane 230 simultaneously and display the full set of corresponding metadata in each simultaneously.

A fourth and still more detailed level of information can be accessed by the user by clinking on a small "paper clip" or content icon (not shown), which may be similar to that used to depict an email attachment in standard email programs, which icon may be typically found to the left of certain links displayed inside the pop-up windows and as one of the fields in certain rows in the activated Catalyst List Pane 80. The user can also access the content in question by means of a link which may be displayed as one of the fields in the Catalyst Description Pane 230, assuming the catalyst in question has been activated inside the Catalyst Description Pane 230. Assuming that the user is provisioned to have access to the corresponding content, the user may click on the content symbol and the full underlying content of the associated catalyst may be displayed, either within the same window or as a separate window. For example, in the case of a news item, clicking on the associated icon may result in the presentation of the full news article (not shown).

If there is no content symbol associated with the relevant catalyst, then there is no further underlying content. This fourth level of information represents additional complexity in the sense that the user may not have complete and unfettered access to the underlying content. At this point, the user may be prompted to modify his/her access to the underlying source, whether by purchasing access (to a single item or to some or all of the sources' content) or by some other provisioning mechanism. At this level, content may be exported or downloaded, either to the current platform of the invention or to a different platform or application. In the case of unstructured content, the content can be saved in numerous formats, such as MS Word, Adobe Acrobat or HTML. In the case of structured content and other predominantly quantitative information, the content may be exported to Microsoft Excel or Word, for example.

A fifth and final level of information may be accessed by being directed to the website or application that represents the source(s), publisher(s) and other parties to the content in question. Navigation to this level may be provided by one or more links which can be found in certain fields of the Catalyst List Pane 80 and/or Catalyst Description Pane 230. For example, if the content in question is an article from the New York Times and the user wants to search for related content within the New York Times archives, the user may access this archival information by clicking on the link to the New York Times website directly from inside the present invention. This, of course, assumes that the user is pre-provisioned to access such archival content or other third-party analytics. If not, the present invention may provide methods for modifying access to related third-party content providers.

The present invention provides the above multiple levels of data access via basic data monitoring and subsequent drill down capability so that the user can access and analyze the information at the speed and level defined by that user.

Other Features

Note that the illustrated embodiments are not limiting and that additional features may be added and be within the scope of the present invention. Multiple windows are contemplated to view multiple securities with a combination of drill down windows.

Additionally, various catalysts may automatically be given a "weighting" governed by known quantitative analysis methods and other artificial intelligence techniques to support the detection of patterns in the data. For example, catalysts may be weighted depending upon which catalysts are deemed likely to cause the most volatility.

Specific embodiments of an event driven financial analysis interface and system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described herein. It is therefore contemplated to cover by the present invention, any and all modifications, variations, or equivalents that fall within the true spirit and scope of the basic underlying principles disclosed and claimed herein.

What is claimed is:

1. A user interface having a display device coupled to a computer, configured to display financial data to a user on a display screen about a selected security, the interface providing display information comprising:
   a time series representing historical data for the security over a user-selectable period of time;
   a first group of catalysts mapped in parallel with and at a same scale as the time series;
   a second group of catalysts mapped at the same scale as the time series, and representing future data corresponding to the security;
   each catalyst represented by an icon; and
   each icon having one or more attributes providing direct visual information to the user if a data density is less than a predetermined value, and the icon indicating only an existence of the catalyst and a time frame of the catalyst if the data density is greater than the predetermined value.

2. An system for graphically displaying financial data to a user, the system comprising:
   a computer operatively coupled to a display;
   one or more databases operatively coupled to the computer;
   a communications link configured to permit the computer to access the databases;
   a user interface configured to display information about a user-selected security on the display screen;
   the information further including:
      a time series representing past historical data for the security over a selectable period of time;
      a group of catalysts mapped in parallel with and at a same scale as the time series, each catalyst represented by an icon;
      each icon having one or more attributes that provide direct visual information to the user if a data density is less than a predetermined value; and
      the icon indicating only an existence of the catalyst and a time frame of the catalyst if the data density is greater than the predetermined value.

3. A method for graphically displaying financial data to a user, the method comprising:
   providing a computer and one or more databases;
   providing a user interface having a display device coupled to the computer, the display device configured to display information on a single display screen;
   selecting, by the user, a security to be displayed;
   accessing the database to obtain data corresponding to the selected security;
   displaying on the single display screen:
      a time series representing historical data for the selected security over a user-selectable period of time;
      a first group of catalysts mapped in parallel with and at a same scale as the time series corresponding to the selected security;
      a second group of catalysts mapped to future data corresponding to the selected security;
      each catalyst represented by an icon;
         the icon having one or more attributes that provide direct visual information to the user if a data density is less than a predetermined value; and
         the icon indicating only an existence of the catalyst and a time frame of the catalyst if the data density is greater than the predetermined value.

4. A computer readable memory or data storage means encoded with data representing a computer program for a display system for graphically displaying financial data to a user, the display system including a computer, one or more databases operatively coupled to the computer, and a display device operatively coupled to the computer and configured to display information about a selected security on the display device, the computer readable memory or data storage means comprising:
   means for displaying
      a time series representing past historical data for the security over a selectable period of time;
      a first group of catalysts mapped in parallel with and at a same scale as the time series corresponding to the security;
      a second group of catalysts mapped to future data corresponding to the security, each catalyst represented by an icon;
      the icon having one or more attributes that provide direct visual information to the user if a data density is less than a predetermined value; and
      the icon indicating only an existence of the catalyst and a time frame of the catalyst if the data density is greater than the predetermined value.

5. An system for graphically displaying financial data to a user, the system comprising:
   a computer operatively coupled to a display;
   one or more databases operatively coupled to the computer;
   a communications link configured to permit the computer to access the databases;
   a user interface configured to display information about a selected security on a display screen;
   the information further including:
      a time series representing historical data for the security over a selectable period of time;
      a first group of catalysts mapped in parallel with and at a same scale as the time series corresponding to the security;
      a second group of catalysts mapped to future data corresponding to the security;
      each catalyst represented by an icon;
         the icon having one or more attributes that provide direct visual information to the user if a data density is less than a predetermined value; and
         the icon indicating only an existence of the catalyst and a time frame of the catalyst if the data density is greater than the predetermined value.

6. The system according to claim 5, wherein the time series is selected from the group consisting of a price chart, bond yield, volatility, fund performance and security spread.

7. The system according to claim 5, wherein the selectable period of time is selectively compressible and expandable by the user.

8. The system according to claim 5, wherein the information displayed on the display can be variably divided by the user to show historical data on one portion of the screen and future data on another portion of the screen.

9. The system according to claim 5, wherein the information is displayed on a single display screen.

10. The system according to claim 5, wherein no scrolling of the display is needed to permit the user to observe the information.

11. The system according to claim 5, wherein the data density is proportional to the period of time selected by the user.

12. The system according to claim 5, wherein if the data density is greater than the predetermined value, the icon appears as a point indicator that does not provide direct information.

13. The system according to claim 12, wherein if the data density is greater than the predetermined value, the icon only indicates the existence of the catalyst and its time frame.

14. The system according to claim 5, wherein if the data density is less than the predetermined value, the icon displays attributes selected from the group consisting of color, geometric shape, size and a representative figure.

15. The system according to claim 5, wherein a plurality of like catalysts are organized into one or more tiers of catalysts.

16. The system according to claim 5, wherein each catalyst is configured to provide pop-up type data on the display when the user places a cursor over the icon corresponding to the catalyst.

17. The system according to claim 5, wherein the catalysts are selected from the group consisting of corporate actions, corporate releases, economic releases, meetings, news events, proprietary events, regulatory events, research events and structural events.

18. The system according to claim 5, wherein certain catalysts provide links to information external to the database.

19. The system according to claim 18, wherein the links direct the user to data accessible via the internet.

* * * * *